Patented Feb. 5, 1929.

1,701,220

UNITED STATES PATENT OFFICE.

GLENN H. WILLIS, OF AKRON, OHIO, ASSIGNOR, BY MESNE ASSIGNMENTS, TO TAN-SEIB COMPANY, OF AKRON, OHIO, A CORPORATION OF OHIO.

PROCESS OF PRODUCING COLORED COMPOSITE MATERIALS.

No Drawing. Application filed October 31, 1927. Serial No. 229,805.

This invention relates to new and useful improvements in processes of producing colored composite materials. While any suitable base stock or binding material may be used and various fillers employed, the invention is particularly intended for use in manufacturing a composite material composed of rubber, having incorporated therein fibrous, pulpous, granular or other suitable materials.

By the old and well known method of producing a colored composite material, the coloring pigment and fibrous material are added to the compound as a whole. By this well known method, the fibrous, pulpous or granular ingredients will not absorb the dry coloring matter added to the compound as readily as the soft, tacky binding ingredients, resulting in an ununiform color to the finished product. This is particularly noticeable when the product is worn away, cut or abraded. As can be readily seen, the higher the percentage of fiber or other filler used, the less uniformity will be found in the finished product.

It is therefore an object of this invention to provide a new and useful improvement in processes for manufacturing composite material which may be followed to produce a product having a uniform color throughout.

A further object of the invention is to produce a new and improved method of producing composite material in which the base stock may be colored with a dry pigment or other coloring most suitable and the fibrous material or filler may be dyed any color or shape corresponding to the color of the base stock and to thereby provide a product having a uniform lasting color throughout.

The above objects are accomplished and additional ends are attained by the process of manufacture hereinafter described, it being understood that changes and modifications may be made or substitutions resorted to which come within the spirit of the invention as set forth in the appended claims.

In carrying out the invention, ordinary instrumentalities may be employed and ordinary pigments, dyes or other coloring materials most suitable to each particular ingredient may be employed by any of the dyeing processes known to those versed in the art.

Briefly stated, the invention comprises coloring the base stock or binding agent and separably coloring the fibrous, pulpous, granular or other filling material, then adding and incorporating the filling material into the base stock.

In carrying out my invention, I take a quantity of material such as cotton, wool, hair, jute, wood, fiber, sawdust, ground or granulated cork, vegetable fiber, paper, leather, clay, chalk or any pulpous, fibrous or absorbent material. This material is dyed with an acid dye or other suitable dye by any of the processes known in the art. I then take the binding material and reduce it to a plastic mass in a mill. To this plastic mass is added a dry color which is thoroughly incorporated into the base stock by milling. The resultant product is then sheeted or molded as desired and is vulcanized, baked or otherwise cured.

As a particular example, I place in a mixing mill or other plastic mixing machine, the following ingredients:

| | Per cent. |
|---|---|
| Smoked sheet rubber | 19 |
| Pure gum, inner tube reclaimed rubber | 17½ |
| Zinc oxide | 4 |
| Lithopone | 8 |
| Lime | 1¼ |
| Cotton seed oil | 3 |
| Sulphur | 1¼ |
| Diphenylguanidine | ½ |
| Bombay red coloring pigment | ½ |

This is thoroughly milled until the red coloring pigment is mixed with the compound. I then take fibrous material such as hair and dye the same with an acid dye or other suitable coloring matter to the exact shade of the compound, produced as above set forth. The hair is then dried and is introduced into the mill and thoroughly mixed with the base stock to provide forty percent of the composite product thus produced. After the fibrous material has been thoroughly mixed with the base stock, the resultant mass is sheeted, molded or otherwise prepared for vulcanization. The process of vulcanization is carried out by the method well known to those versed in the art. The particular time and temperature which may be best employed in vulcanizing the mixture above described is heat of 300° F., for a period of twelve minutes.

The resultant product is particularly adapted for floor coverings and when used as such is cured or vulcanized between the heated platens of a hydraulic press, in such thickness as may be desired. During vulcanization, a quantity of the binding material or base stock will flow to the surface of the mold, thus forming a product having a relatively tough impervious skin on the surface thereof. The product thus produced is adapted for use in many ways and will present a uniform appearance even when subjected to a use sufficient to wear away the surface thereof.

While the product thus formed is complete and may be used as vulcanized, it may be made more attractive and more suitable for some uses by the following steps: The surface or skin may be removed to expose the colored or dyed hair or other filler, resulting in an exceedingly attractive product of uniform color. The removal of the surface skin may be done in any desired manner. It may be ground, cut or subjected to the action of a wire brush as set forth and described in my pending application, Serial Number 51,143.

Having thus set forth the objects of the invention and described my improved method in detail, what I claim as new and desire to secure by Letters Patent is:—

1. That method of manufacturing a colored composite material comprising; mixing a base stock, coloring the same, separately coloring a filler, then thoroughly mixing the filler with the base stock.

2. That method of manufacturing a colored composite material comprising mixing a base stock, coloring the same to the desired shade, separately coloring a filler to match the color of the base stock, then thoroughly mixing the filler with the base stock.

3. That method of manufacturing a colored composite material comprising mixing a base stock until it is reduced to a plastic mass, thoroughly mixing therewith a colored pigment, separately coloring a filler, then thoroughly mixing the filler with the base stock.

4. That method of manufacturing a colored composite material, comprising mixing a base stock until it is reduced to a plastic mass, thoroughly mixing therewith a coloring pigment, coloring a filler to match the color of the base stock, then thoroughly mixing the filler with a base stock.

5. That method of manufacturing a colored composite material, comprising mixing a base compound until it is reduced to a plastic mass, mixing a coloring material therewith, coloring a filler with a different coloring material, then thoroughly mixing the colored filler with the base stock.

6. That method of manufacturing a colored composite material comprising, mixing a base stock until it is reduced to a plastic mass, thoroughly mixing a coloring matter therewith, coloring a filler with a different coloring material to the exact shade of the colored base stock, then thoroughly mixing the colored filler with the colored base stock.

7. That method of manufacturing a colored composite material comprising, mixing a base stock, coloring the same, separately coloring a fibrous material, then thoroughly mixing the fibrous material with a base stock.

8. That method of manufacturing a colored composite material comprising, taking a quantity of rubber, reducing it to a plastic mass, coloring the same to the desired shade, separately coloring fibrous material to match the color of the base stock, then thoroughly mixing the fibrous material with the rubber 9. That method of manufacturing a colored composite material comprising, taking a quantity of rubber, milling the same until it is reduced to a plastic mass, thoroughly milling a colored pigment into the mass, separately coloring a filler, then thoroughly milling the filler into the base stock.

10. That method of manufacturing a colored composite material, comprising mixing a rubber base stock until it is reduced to a plastic mass, thoroughly mixing therewith a coloring pigment, dyeing a filler to match the color of the base stock, then thoroughly mixing the filler with a base stock.

11. That method of manufacturing a colored composite material, comprising mixing a rubber compound until it is reduced to a plastic mass, mixing a coloring material therewith, dyeing fibers, then thoroughly mixing the dyed fiber with the rubber base stock.

12. That method of manufacturing a colored composite material comprising, taking a quantity of rubber, milling it until it is reduced to a plastic mass, thoroughly mixing a coloring matter therewith, dyeing fibrous material to the exact shade of the colored matter, then thoroughly milling the colored fibrous material into the plastic mass, forming the mass into an article of the desired shape and submitting the same to vulcanization.

13. That method of manufacturing a colored composite material comprising mixing a rubber compound until it is reduced to a plastic mass, coloring a filler, then thoroughly mixing the filler with the plastic mass, forming the resultant mass into articles of the desired shape and submitting the same to vulcanization.

14. That method of manufacturing a colored composite material comprising mixing a base stock, coloring the same, separately coloring a filler, then mixing the colored filler with the colored base stock, forming the resultant mixture into articles of the desired shape, submitting the same to vulcanization then removing the surface of the article thus formed.

15. That method of manufacturing a colored composite material comprising mixing a base stock, coloring the same to the desired shade, separately coloring a filler to match the color of the base stock, thoroughly mixing the filler with the base stock, forming the resultant mixture into articles of the desired shape, curing the article; then abrading the surface of the article to expose the filler.

16. That method of manufacturing a colored composite material comprising mixing a base stock, coloring the same to the desired shade, separately coloring a filler to match the color of the base stock, thoroughly mixing the filler with the base stock, forming the mixture into an article of the desired shape, submitting the article to vulcanization, then removing the surface of the article thus formed.

17. That method of manufacturing a colored composite material, comprising mixing a rubber compound until it is reduced to a plastic mass, mixing a coloring material therewith, dyeing fibers, then thoroughly mixing the dyed fiber with the rubber base stock; forming the resultant mixture into the desired form, submitting the same to vulcanization, then removing the surface of the article to expose a portion of the fiber embedded therein.

In testimony whereof I have hereunto set my hand.

GLENN H. WILLIS.